US012774502B2

(12) United States Patent
Ravet et al.

(10) Patent No.: US 12,774,502 B2
(45) Date of Patent: Oct. 27, 2026

(54) GAS QUENCHING CELL

(71) Applicant: ECM TECHNOLOGIES, Grenoble (FR)

(72) Inventors: Stephane Ravet, Grenoble (FR); Gerard Tissot, Grenoble (FR)

(73) Assignee: ECM TECHNOLOGIES, Grenoble (FR)

(*) Notice: Subject to any disclaimer, the term of this patent is extended or adjusted under 35 U.S.C. 154(b) by 527 days.

(21) Appl. No.: 17/755,115

(22) PCT Filed: Oct. 7, 2020

(86) PCT No.: PCT/EP2020/078167
§ 371 (c)(1),
(2) Date: Apr. 21, 2022

(87) PCT Pub. No.: WO2021/078520
PCT Pub. Date: Apr. 29, 2021

(65) Prior Publication Data

US 2022/0364192 A1 Nov. 17, 2022

(30) Foreign Application Priority Data

Oct. 24, 2019 (FR) ....................................... 1911902

(51) Int. Cl.

| | |
|---|---|
| ***C21D 1/767*** | (2006.01) |
| ***C03B 27/04*** | (2006.01) |
| ***C21D 1/613*** | (2006.01) |
| ***C21D 1/62*** | (2006.01) |
| ***F25D 3/10*** | (2006.01) |

(52) U.S. Cl.
CPC .............. *C21D 1/767* (2013.01); *C03B 27/04* (2013.01); *C21D 1/613* (2013.01); *C21D 1/62* (2013.01); *F25D 3/10* (2013.01)

(58) Field of Classification Search
CPC ...... C21D 1/767; C21D 1/613; C21D 9/0018; C21D 9/0025; C21D 9/0062; C03B 27/04;
(Continued)

(56) References Cited

U.S. PATENT DOCUMENTS 5,052,923 A * 10/1991 Peter ...................... C21D 1/773 219/390
5,265,851 A * 11/1993 Beuret ..................... C21D 1/74 266/143
(Continued)

FOREIGN PATENT DOCUMENTS

CN 107988474 A * 5/2018 ........... C21D 9/0062
EP 0483596 A1 * 5/1992 ................ F27B 5/04
(Continued)

OTHER PUBLICATIONS

EP-0483596-B1 Trans (English Language Translation) (Year: 1994).*
(Continued)

*Primary Examiner* — Keith D. Hendricks
*Assistant Examiner* — Moriah S. Smoot
(74) *Attorney, Agent, or Firm* — Perilla Knox & Hildebrandt LLP; Jason M. Perilla

(57) ABSTRACT

The present description concerns a gas cooling cell, comprising: a chamber; at least one opening in the chamber, of access to a treatment space internal to the chamber; at least one door for closing the opening; and a system (4), internal to the chamber, comprising at least one wall (42) mobile between a first position where this wall forms a screen between the opening and the treatment space, and a second position where said wall clears the access to the treatment space from the opening.

15 Claims, 4 Drawing Sheets

(58) Field of Classification Search
CPC ........ F25D 3/10; F25D 2400/28; F25D 17/06; F25D 23/02
See application file for complete search history.

(56) References Cited

U.S. PATENT DOCUMENTS

| | | | | | |
|---|---|---|---|---|---|
| 6,116,580 | A * | 9/2000 | Hull | B66D 1/06 | 74/577 R |
| 2005/0000597 | A1* | 1/2005 | Fromont | C21D 1/62 | 148/219 |

FOREIGN PATENT DOCUMENTS

| | | | | | |
|---|---|---|---|---|---|
| EP | 0483596 | B1 * | 9/1994 | C21D 1/767 |
| FR | 2713322 | A1 * | 6/1995 | F27D 3/00 |
| JP | 2009287085 | A * | 12/2009 | |
| JP | 4709955 | B2 * | 6/2011 | |
| JP | 6427949 | B2 * | 11/2018 | |

OTHER PUBLICATIONS

JP-2009287085-A Trans (English Language Translation) (Year: 2009).*
CN-107988474-A Trans (English Language Translation) (Year: 2018).*
EP-0483596-A1 Trans (English Language Translation) (Year: 1992).*
JP-4709955-B2 Trans (English Language Translation) (Year: 2011).*
FR-2713322-A1 Trans (English Language Translation) (Year: 1995).*
International Search Report for PCT/EP2020/078167 mailed Dec. 15, 2020.
International Preliminary Report on Patentability for PCT/EP2020/078167 mailed Dec. 15, 2020.

* cited by examiner

GAS QUENCHING CELL

The present patent application is a 35 U.S.C. § 371 National Stage Patent Application of Patent Cooperation Treaty Application number PCT/EP2020/078167, filed on Oct. 7, 2020, and titled "GAS QUENCHING CELL," which claims the priority benefit of French Patent Application FR19/11902, filed Oct. 24, 2019, titled "GAS QUENCHING CELL," the entire contents of both of which applications are hereby is herein incorporated herein by reference.

TECHNICAL BACKGROUND

The present disclosure generally concerns metal or glass part treatment installations, and more particularly gas quenching cells.

PRIOR ART

Gas quenching cells are particularly widespread in the industry to treat parts made of metal or of an alloy based on metals, or even of glass. This treatment of solid-state parts is typically a fast cooling (quenching) thermal treatment.

A quenching cell is generally formed of a tight chamber having a circulation of gas for cooling (or gas for quenching) parts to be treated placed in the chamber, organized therein. This circulation conditions the quality of the treatment and the performance of the installation.

SUMMARY OF THE INVENTION

An embodiment overcomes all or part of the disadvantages of known quenching cells.

An embodiment provides a quenching cell with an improved circulation of quenching gases.

An embodiment provides a gas cooling cell, comprising:

- a chamber of generally cylindrical shape;
- at least one opening in the chamber, of access to a treatment space internal to the chamber;
- at least one door for closing the opening; and
- a system, internal to the chamber, comprising at least one wall mobile, in a direction parallel to the axis of the cylindrical chamber, between a first position where this wall forms a screen between the opening and the treatment space, and a second position where said wall clears the access to the treatment space from the opening.

According to an embodiment, the mobile wall takes part in channeling the gas flow towards the treatment space.

According to an embodiment, the cell comprises a plurality of openings of access to the treatment space, said system comprising a mobile wall between each opening and the treatment space.

According to an embodiment, the chamber comprises two openings of access to the treatment space.

According to an embodiment, said system comprises four walls arranged to form a frame around the treatment space.

According to an embodiment, the frame is intended, when it is in the first position, to surround a load arranged in the treatment space.

According to an embodiment, the gas circulation in the chamber is performed in closed circuit, in a first direction in the central portion of the chamber including the treatment space and in a second direction at the periphery of the chamber.

According to an embodiment, the wall(s) are equipped with deflector elements at the level of their lower edges.

According to an embodiment, the wall(s) are vertically mobile in translation.

According to an embodiment, the cell further comprises a mechanism for controlling a displacement of the system with mobile wall(s) from one position to the other.

According to an embodiment, said mechanism comprises:

- a rotating shaft along an axis perpendicular to the direction of the motion of the mobile wall(s); and
- at least one arm for converting a rotating motion of the shaft into a translational motion of the mobile wall(s).

According to an embodiment, the rotation of shaft is caused from the outside of the chamber by a connecting rod mechanism converting a translational motion of a cylinder into a rotating motion of the shaft.

According to an embodiment, the treatment space comprises a load support, intended to receive a load.

According to an embodiment, the cell comprises a turbine arranged vertically in line with the load support, the turbine comprising:

- a fan, internal to the chamber; and
- an actuator, external to the chamber.

According to an embodiment, the fan is inside of a duct for guiding the gas to the treatment space.

According to an embodiment, the wall(s), in their first position, continue all or part of walls of the duct.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the effects, on parts to be treated, of different quenching gases according to the flow rates, volumes, temperatures, and pressures of these gases are known and will not be detailed, the described embodiments being compatible with usual treatments and parameters (flow rates, volumes, pressures, temperatures, etc.).

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred unless specified otherwise to the orientation of the drawings or to a quenching cell in a normal position of use.

Unless specified otherwise, the expressions "around", "approximately", "substantially" and "in the order of" signify within 10%, and preferably within 5%.

Figure 1:
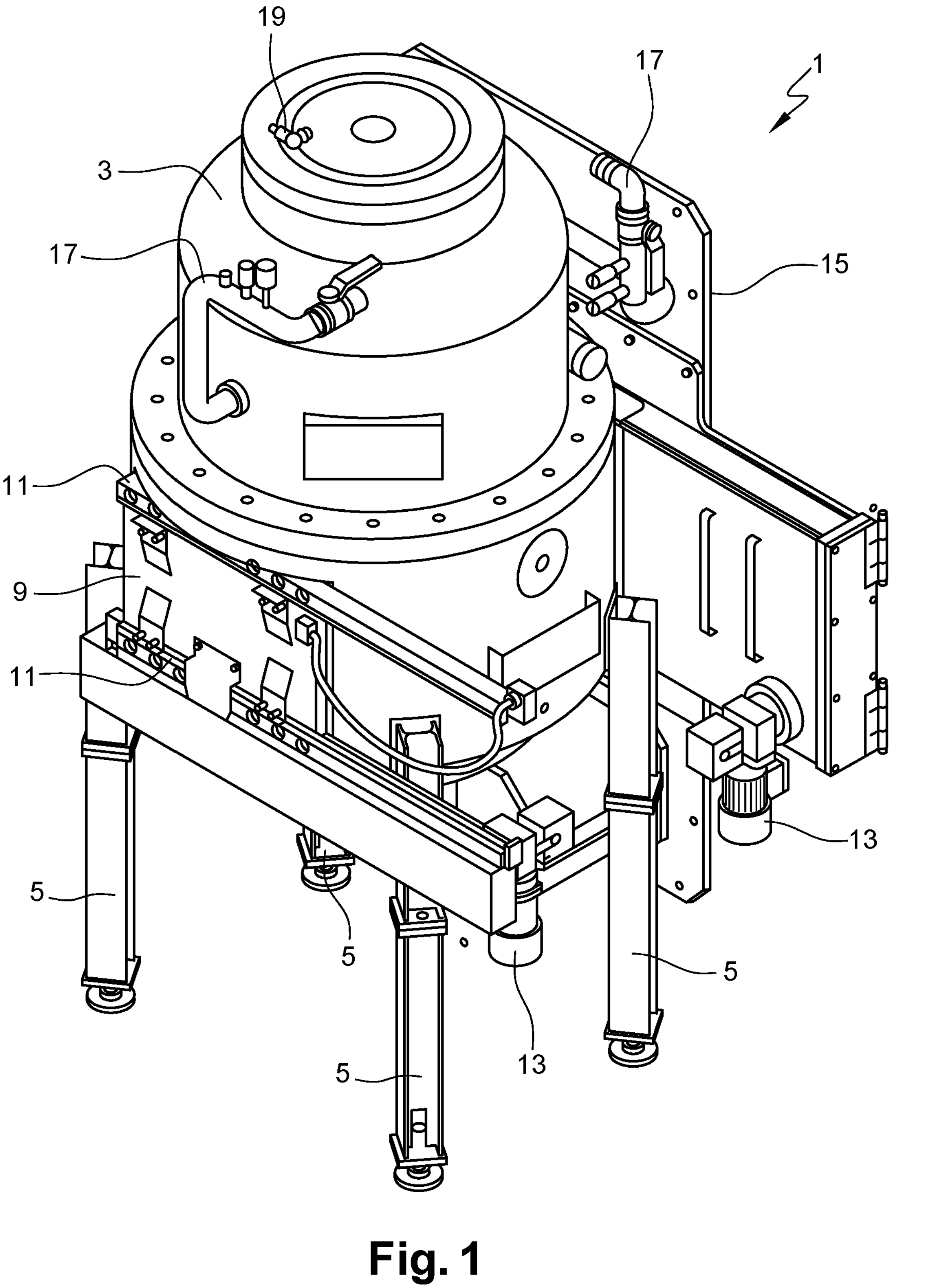
FIG. 1 is an external perspective view of an embodiment of a quenching cell.

FIG. 1 is a perspective view of an embodiment of a rapid cooling cell or quenching cell 1.

Such a cell 1 typically forms part of an installation or line for treating parts made of metal, of a metal alloy, or of glass, which comprises other part manufacturing and treatment stations.

Gas quenching cell 1 comprises a chamber 3, for example, of generally cylindrical shape. Chamber 3 has a vertical or horizontal main direction (main gas circulation direction).

In the preferred example shown in FIG. 1, chamber 3 is a cylindrical chamber having a vertical axis. Chamber 3 rests on supports 5 or legs.

Chamber 3 comprises two openings (not shown in FIG. 1) of access to a treatment space internal to the chamber. The two openings are preferably in front of each other. These two openings are used, particularly in an inline installation, respectively for the introduction or loading of parts to be treated and to the unloading of the treated parts, that is, for the load transfer. As a variant, according to the arrangement of the cell in the treatment installation, the chamber comprises a single opening used to load and unload the parts. Each opening is associated with a door 9, external to chamber 3. Door(s) 9 are for example doors slidably assembled between guide rails 11, for example horizontal, and are moved by motors 13. Door(s) 9 ensure a tight closing of cell 1, the inside of the chamber 3 of quenching cell 1 being, in operation, at pressures generally in the range from 1 to 20 bars.

In the shown example, one of the openings is associated with elements 15 for coupling cell 1 to a module, not shown, of the rest of the installation comprising cell 1. It is for example a heating cell or a transfer chamber. This connection enables to facilitate the automatic transfer, without placing them back in open air, of parts to be treated between this treatment module and the quenching cell. The two openings may each be associated with a module external to the cell.

Gas quenching cell 1 further comprises an exchanger (not shown in FIG. 1), internal to the chamber, to cool the gas(es) during the quenching. The exchanger is supplied with coolant, for example, water, by ducts 17.

The gases are, in the example of the cell of FIG. 1, introduced by a duct 19 located in the upper portion of chamber 3. As an example, the gases used for the quenching in cell 1 are nitrogen, helium, and/or argon.

Figure 2:
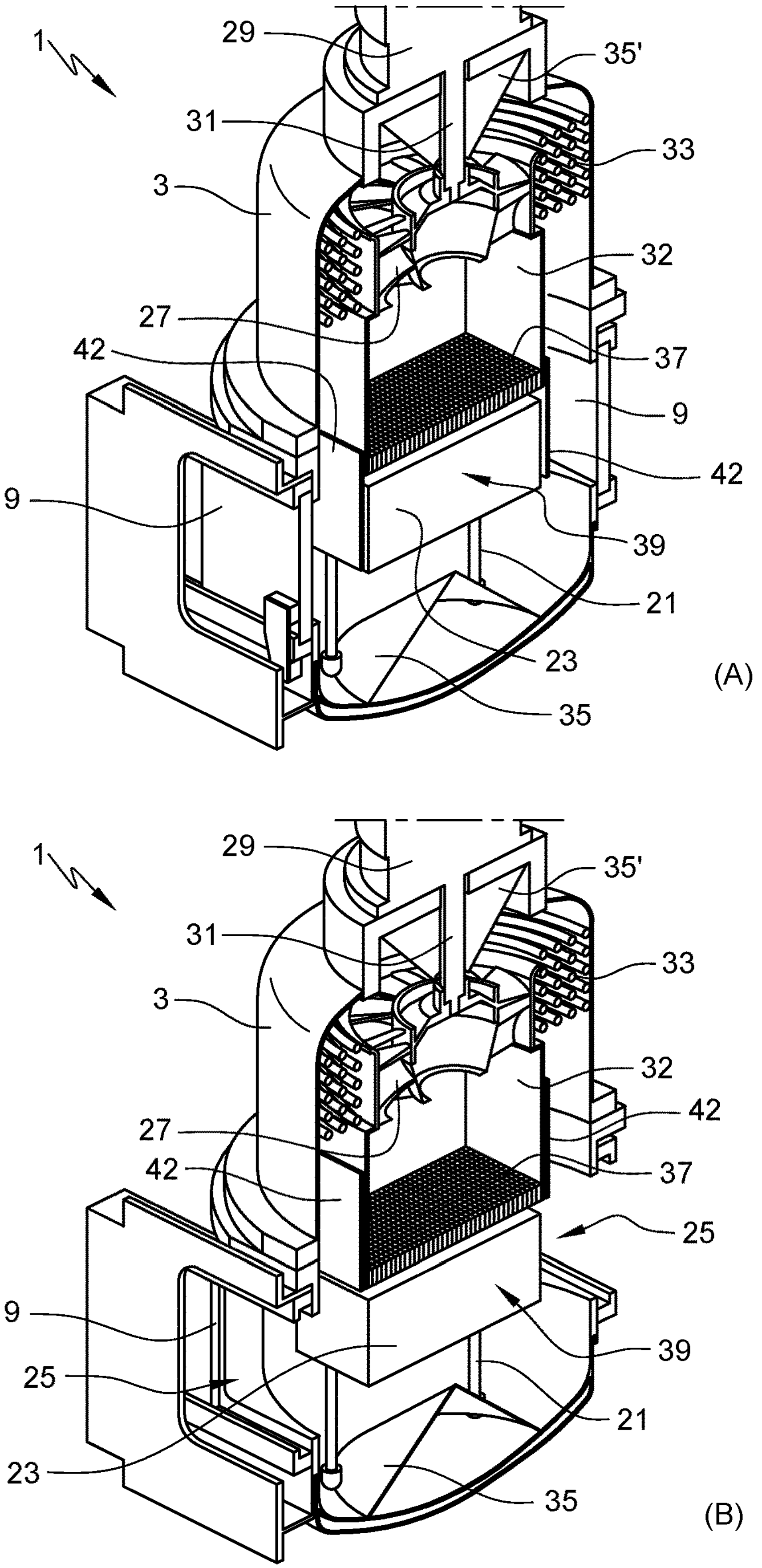
FIG. 2 shows partial perspective cross-views A and B of an embodiment of a quenching cell.

FIG. 2 shows, in partial perspective cross-section views A and B, an embodiment of a quenching cell.

View A of FIG. 2 shows cell 1 during a quenching cycle, the cell doors 9 being closed. View B of FIG. 2 shows cell 1 with open doors 9, for example, during a phase of loading of parts to be treated or of unloading of treated parts.

Cell 1 comprises, inside of chamber 3, at the level of a treatment space 39, a support 21 intended to receive a load 23 to be treated. Load support 21 is selected to enable to arrange load 23 inside of chamber 3, so that the load is centered in the horizontal plane of chamber 3 and is aligned with opening(s) 25 (FIG. 2B).

Load 23 is schematically illustrated in FIG. 2 by a cuboid, representing the volume occupied by the load in the chamber. In practice, the load comprises a plurality of parts to be treated, arranged in one or a plurality of open-work baskets and/or on an open-work plate.

Cell 1 further comprises a turbine vertically in line with load support 21. The turbine comprises a fan 27, internal to chamber 3, and a drive motor 29, external to the chamber. A shaft 31 crosses an upper portion of chamber 3 and couples motor 29 to fan 27.

Fan 27 is arranged inside of a duct 32 for guiding the gases towards load support 21. Fan 27 is preferably located inside of the upper end of duct 32. Duct 32 preferably has a circular cross-section in its upper portion, comprising the fan, and a square or rectangular cross-section at its other end, adapted to the shape within which the load to be treated is inscribed.

During the quenching of a load 23, the circulation of the quenching gas in the chamber 3 of cell 1 is generally performed in closed circuit. Fan 27 drives the gas in duct 32 downwards, in other words towards support 21, and thus the load 23 to be treated. The quenching gas crosses the load 23 placed in treatment space 39 before rising back in the chamber via a peripheral space between duct 32 and the walls of chamber 3.

The gas circulation accelerated by the fan allows a more rapid cooling. By rapid, there is meant a cooling rate, for metal parts, in the range from approximately 5 degrees per second to approximately 10 degrees per second.

A heat exchanger 33 is located in this peripheral space, preferably in the upper portion at the level of fan 27. Exchanger 33 has the function of cooling the gas before it is propelled again towards load 23 in the closed circuit circulation.

To facilitate the circulation of the gas flow in the lower portion of the chamber and, more particularly, redirect the gas from the central portion to the periphery of the chamber, a conical structure 35, directed upwards, is arranged under load support 21. The tip of cone 35 is approximately coaxial with the axis of fan 27.

A similar conical structure 35', directed downwards, is provided in the upper portion of the chamber, to bring back the gas flow, cooled by the exchanger, from the peripheral circulation space to the center of the chamber. The tip of the cone of structure 35' is approximately coaxial with the axis of the fan.

Conical structures 35 and 35' facilitate the gas circulation at the center of the chamber from top to bottom and at the periphery of the chamber from bottom to top.

Preferably, a grid 37 used to homogenize the gas flow arriving onto the load is arranged inside of duct 32, preferably at the level of its lower end. The function of grid 37 is to make the gas flow laminar at the level of load 23.

The quality of the treatment and the performance of the installation depend on the homogeneity of the gas circulation in chamber 3. The described embodiments originate from a novel analysis of gas flows in a treatment chamber. There appears from this analysis that the presence of doors 9, and more particularly of openings 25 and of the corresponding door frames, tends to create vortices which interfere with the laminar flow of gases in the chamber. This disturbs not only the peripheral upward flow of gases, but especially the homogeneity of the downward gas flow at the level of the load and in the load from top to bottom at the level of the portions of the load located in front of openings

25. This phenomenon is enhanced in the case of a cylindrical chamber, which corresponds to most of the cases.

To overcome this phenomenon, there is provided, in cell 1, a mobile wall system 42, associating with each opening 25 of chamber 3, a mobile wall 42, internal to the chamber and mobile in the axial direction of the chamber which is cylindrical, opening 25 being on the periphery of the chamber and not at an axial end. In other words, opening 25 and wall(s) 42 are in planes parallel to the axis of the chamber.

The function of walls 42 is to form a screen between openings 25 and treatment space 39, more particularly between openings 25 and at least the portions of load 23 in front of these openings. To avoid hindering the loading of cell 1 with parts to be treated and its unloading of the treated parts, walls 42 are mobile at least between a first (low) position, illustrated in FIG. 2A, where they form a screen between load 23 and the corresponding opening 25, and a second (high) position, illustrated in FIG. 2B, where they clear the access to load support 21, and thus to treatment space 39.

The view A of FIG. 2 illustrates a position of walls 42 during a quenching cycle. Each mobile wall 42 is positioned as a continuation of walls of duct 32. In this position, mobile walls 42 protect the downward flow through load 23 from possible disturbances of the upward flow in chamber 3, generated by openings 25. In the shown example, mobile walls 42 are further used to guide the downward flow towards the load, by continuing duct 32 downwards.

The view B of FIG. 2 illustrates a position of walls 42 outside of the quenching cycle, for example, when the doors 9 of cell 1 are open. Mobile walls 42 are then positioned to clear the access to openings 25, and conversely, to treatment space 39 and thus to the load. Preferably, in this position, mobile walls 42 are raised, for example, on either side of duct 32.

The number of mobile walls 42 may vary and for example depends on the shape of chamber 3 and on the elements internal to the chamber. In the described embodiments, the chamber has a generally cylindrical shape, and the wall(s) are mobile in a direction parallel to the axis of the chamber. For example, a chamber having a single opening 25 may be provided with a single mobile wall. According to a preferred embodiment, four mobile walls are provided. This enables to surround treatment space 39, and thus load 23, and to thus improve the function of gas flow guiding therethrough.

The guiding of the flow operated by walls 42 enables to isolate the downward gas flow from the upward gas flow after having crossed the load. Thus, the downward gas flow (for treating the load) is less, or is no longer, disturbed by possible gas swirling effects at the level of the frames 25 of doors 9. This enables to homogenize the treatment flow and thus improves the quality of the treated parts.

Figure 3:
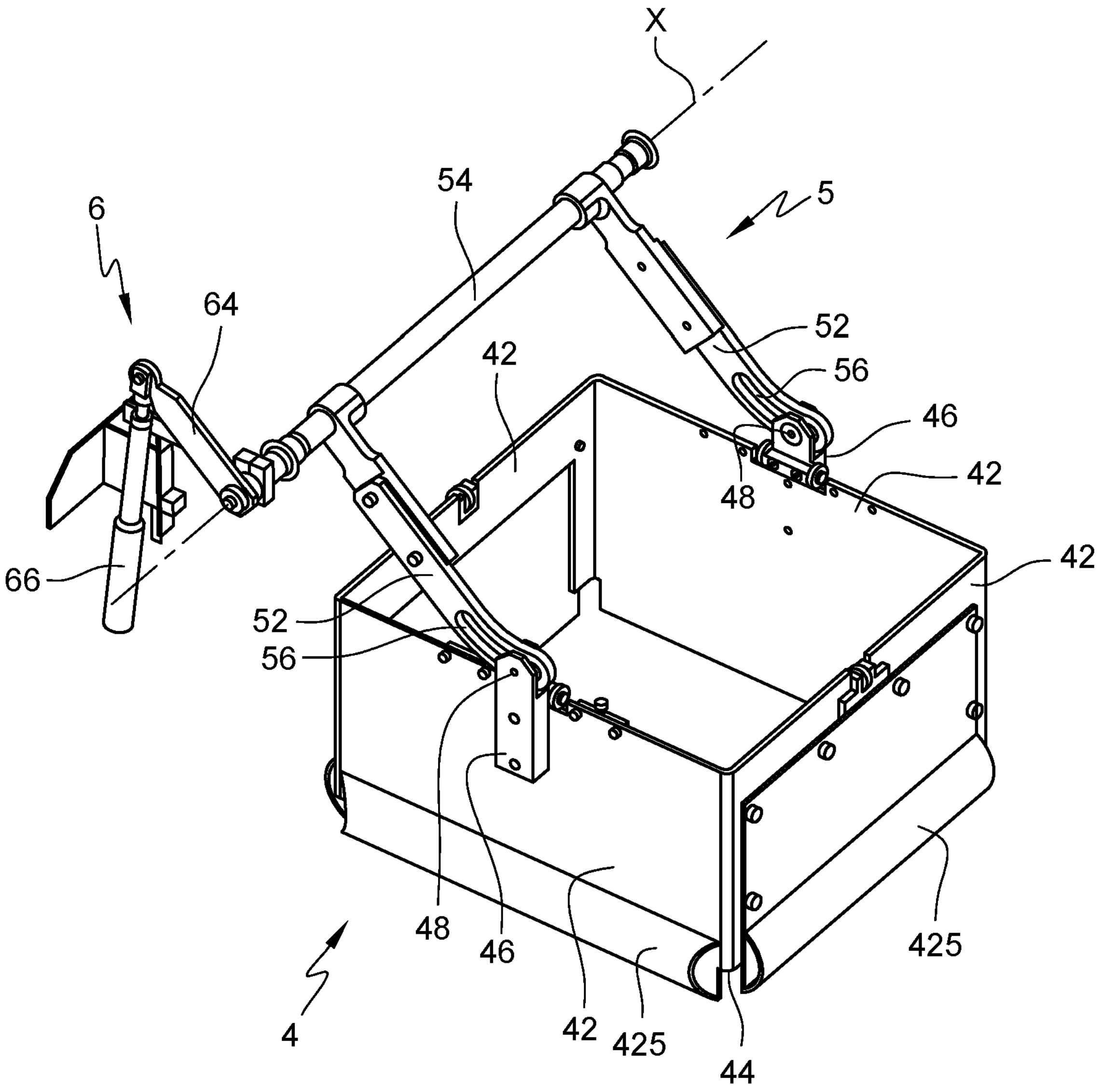
FIG. 3 is a perspective view of a preferred embodiment of a system with mobile walls for a quenching cell.

FIG. 3 is a perspective view of a preferred embodiment of a system 4 with mobile walls 42 for a quenching cell.

According to this embodiment, system 4 comprises four walls 42 arranged to form a frame 44, or sleeve or chimney, for example, cuboid. Frame 44 is mobile, parallel to the axis of the cylindrical chamber, between a high position (view B, FIG. 2) and a low position (view A, FIG. 2). For example, frame 44 comprises, in the upper portion of two opposite walls 42, tabs 46 intended to be coupled (suspended) to a control mechanism 5 adapted to moving frame 44 between the two positions.

For example, mechanism 5 comprises a horizontal shaft 54 having first ends of curved arms 52 coupled thereto. Second ends of arms 52 comprise ports or slots 56 following, in a vertical plane, an arc of a circle. Each port 56 slidably receives a horizontal pin 48 of one of the vertical tabs 46 for suspending frame 44.

The function of mechanism 5 is to transform a rotating motion of shaft 54 around its axis X into a vertical translational motion of frame 44 between its high and low positions, pins 48 sliding in ports 56 to pass from one position to another with the vertical pivoting of arms 52 under the effect of the rotation of shaft 54. The axis X of shaft 54 is thus perpendicular to the direction of the motion of walls 42.

Shaft 54 is preferably arranged in laterally offset fashion with respect to frame 44, to be outside of duct 32 and not to disturb the gas circulation.

An advantage of providing such a motion conversion is that this facilitates the control of the vertical translation of system 4 with mobile walls 42 from the outside of the chamber while preserving the tightness of cell 3. For example, shaft 54 crosses chamber 3 horizontally while being supported by tight connections and its rotation is controlled from the outside by a mechanism 6 by a connecting rod 64 transforming a translational motion, for example, vertical, of a cylinder 66 into a rotating motion of shaft 54.

In low position, frame 44 of walls 42 surrounds the load and thus protects it from the gas flow rising along the periphery of the chamber. The load is thus not impacted by possible laminar disturbances generated by the openings 25 of chamber 3.

An advantage of a system surrounding the load such as illustrated in FIG. 3 is that in low position, walls 42 continue duct 32 and thus favor the laminar gas flow from the top of the chamber to treatment space 39.

Preferably, walls 42 comprise, in their lower portion, deflectors 425 of rounded shape to attenuate the effects of the lower edges of walls 42 on the gas circulation, in particular at the level of the reversal of the circulation direction from downwards to upwards.

Figure 4:
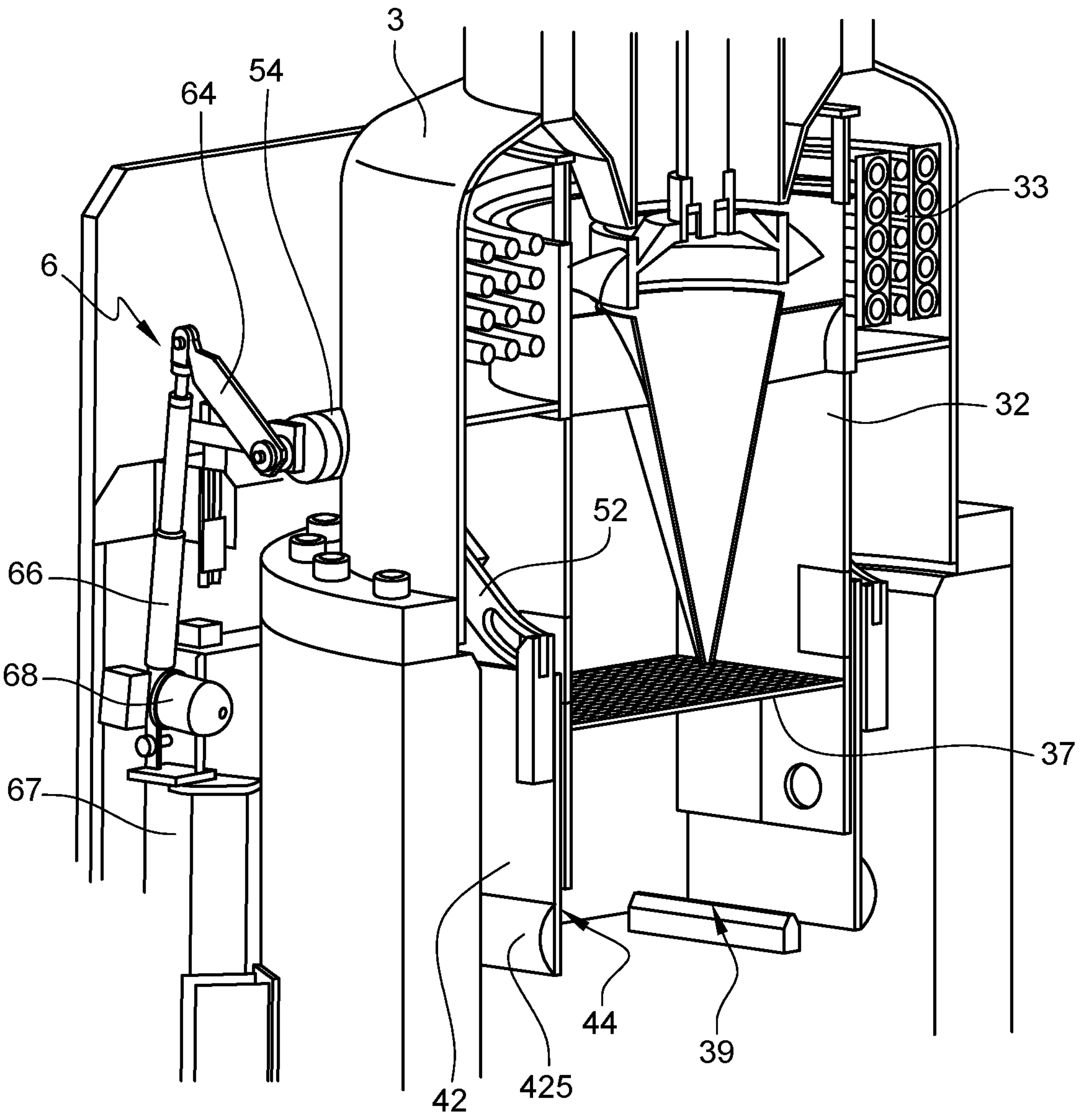
FIG. 4 is a perspective cross-section of an embodiment of a mobile wall system and its actuation mechanism, integrated to a quenching cell.

FIG. 4 is a partial perspective view of a vertical cross-section of an embodiment of a quenching cell 1 equipped with a system 4 such as described in relation with FIG. 3.

On can find therein the different elements described in relation with FIGS. 2 and 3. In the view of FIG. 4, frame 44 is in low position. The lower portion of the cell is not shown in FIG. 4.

FIG. 4 highlights the off-centered position of shaft 54 to avoid disturbing the gas circulation with respect to a mechanism which would be placed under the fan. The fact for shaft 54 not to be placed in line with the fan also justifies the shape of the arms due to the off-centered rotating motion.

FIG. 4 also shows a fastening 67 of mechanism 6 to the chamber and an actuator 68 of cylinder 66.

Various embodiments and variants have been described. Those skilled in the will understand art that certain features of these various embodiments and variants may be combined, and other variants will occur to those skilled in the art. In particular, the adaptation of the system 4 with mobile walls 42 and of its wall displacement mechanism 5 to the shape of chamber 3 and the taking into account of constraints linked to this shape are within the abilities of those skilled in the art based on the above disclosure.

Finally, the practical implementation of the described embodiments and variants is within the abilities of those skilled in the art based on the functional indications given hereabove, in particular, for their adaptation to the concerned quenching cell and more generally to the treatment installation.

The invention claimed is:

1. A gas cooling cell, comprising:

a chamber having the shape of a cylinder, said cylinder having an axis of circular symmetry;

at least one opening in the chamber, of access to a treatment space internal to the chamber;

at least one door for closing the at least one opening; and a system, internal to the chamber, comprising four walls that are mobile in a direction parallel to said axis of circular symmetry between a first position where a first one of said walls forms a screen between the at least one opening and the treatment space and where said walls form a frame around the treatment space, and a second position where said wall clears the access to the treatment space from the at least one opening, wherein the frame comprises tabs coupled to upper portions of two opposite walls of the frame; and a mechanism that controls displacement of the system comprising the four walls, the mechanism comprising:

a shaft that rotates along an axis of rotation perpendicular to a direction of motion of the walls; and two curved arms, each curved arm comprising a first end coupled to the shaft and a second end comprising a port, wherein each port receives a pin of a respective tab of the tabs to suspend the frame by the two curved arms.

2. The gas cooling cell according to claim 1, wherein the walls channel gas flow towards the treatment space.

3. The gas cooling cell according to claim 1, comprising a plurality of openings of access to the treatment space, said system comprising one of the walls between each opening and the treatment space in the first position.

4. The gas cooling cell according to claim 1, wherein the chamber comprises two openings of access to the treatment space.

5. The gas cooling cell according to claim 1, wherein the frame, when it is in the first position, surrounds a load in the treatment space.

6. The gas cooling cell according to claim 1, wherein gas circulation in the chamber is performed in closed circuit, in a first direction in a central portion of the chamber including the treatment space and in a second direction at a periphery of the chamber.

7. The gas cooling cell according to claim 1, wherein the walls are equipped with deflector elements at their lower edges.

8. The gas cooling cell according to claim 1, wherein the walls are vertically mobile parallel to said axis of circular symmetry in an axial direction of the chamber which is cylindrical.

9. The gas cooling cell according to claim 1, wherein the shaft is rotated by a connecting rod mechanism that converts a translational motion of a cylinder into a rotating motion of the shaft.

10. The gas cooling cell according to claim 1, wherein the treatment space comprises a load support.

11. The gas cooling cell according to claim 10, comprising a turbine arranged vertically in line with the load support atop the load support, the turbine comprising:

a fan, internal to the chamber; and an actuator, external to the chamber.

12. The gas cooling cell according to claim 11, wherein the fan is inside of a duct for guiding gas to the treatment space.

13. The gas cooling cell according to claim 12, wherein the walls, in their first position, continue all or part of walls of the duct.

14. The gas cooling cell according to claim 1, wherein the mechanism further comprises:

a cylinder; and a connecting rod between the cylinder and the shaft, wherein the connecting rod transforms a vertical motion of the cylinder into a rotating motion of the shaft.

15. The gas cooling cell according to claim 1, wherein the port of each curved arm among the two curved arms follows an arc of a circle.

* * * * *